(12) United States Patent
White et al.

(10) Patent No.: US 10,572,923 B2
(45) Date of Patent: Feb. 25, 2020

(54) PHYSICAL SHOPPING WITH PHYSICAL AND/OR VIRTUALIZED CUSTOMER ASSISTANCE

(71) Applicant: Walmart Apollo, LLC, Bentonville, AR (US)

(72) Inventors: Richard Andrew White, Pineville, MO (US); Julie Campbell, Bentonville, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 472 days.

(21) Appl. No.: 15/418,102

(22) Filed: Jan. 27, 2017

(65) Prior Publication Data
US 2017/0236175 A1 Aug. 17, 2017

Related U.S. Application Data

(60) Provisional application No. 62/295,591, filed on Feb. 16, 2016.

(51) Int. Cl.
G06Q 30/06 (2012.01)
G06Q 30/02 (2012.01)
(Continued)

(52) U.S. Cl.
CPC ..... *G06Q 30/0613* (2013.01); *G06Q 30/0203* (2013.01); *H04W 4/60* (2018.02); *H04W 40/244* (2013.01)

(58) Field of Classification Search
None
See application file for complete search history.

(56) References Cited

U.S. PATENT DOCUMENTS 7,171,378 B2 * 1/2007 Petrovich ............. G06Q 10/087
705/26.43
8,606,642 B2 12/2013 Siounis et al.
(Continued)

FOREIGN PATENT DOCUMENTS

| CA | 2871413 | 9/2013 |
| CA | 2841332 | 7/2014 |
| WO | 2007041597 | 4/2007 |

OTHER PUBLICATIONS

Motorola Milestones, https://www.motorola.com/us/about/motorola-history-milestones, 2019.
(Continued)

*Primary Examiner* — Thomas L Mansfield
(74) *Attorney, Agent, or Firm* — Schmeiser, Olsen & Watts LLP

(57) ABSTRACT

Disclosed is a system for providing customer assistance for a product in a retail store. The customer accesses customer assistance through a mobile application on their mobile device. If available, a physical customer assistance associate provides assistance to the customer. If a physical customer assistance associate is not available, a remote customer assistance associate provides assistance to the customer. If neither a physical and/or remote customer assistance associate is available, the customer may select a comparison of the product with related in stock products. A comparison may also be selected in combination with a physical and/or remote customer assistance associate.

11 Claims, 4 Drawing Sheets

(51) Int. Cl.
*H04W 40/24* (2009.01)
*H04W 4/60* (2018.01)

(56) References Cited

U.S. PATENT DOCUMENTS

| | | | |
|---|---|---|---|
| 2004/0068443 A1 | 4/2004 | Hopson et al. | |
| 2006/0143081 A1* | 6/2006 | Argaiz | G06Q 30/02 705/14.53 |
| 2008/0308630 A1* | 12/2008 | Bhogal | G06Q 30/02 235/383 |
| 2013/0030915 A1 | 1/2013 | Stalter et al. | |
| 2013/0041837 A1* | 2/2013 | Dempski | G06Q 10/101 705/345 |
| 2013/0198039 A1* | 8/2013 | Sridharan | G06Q 30/016 705/26.44 |
| 2013/0203439 A1* | 8/2013 | Lifshitz | H04W 64/00 455/456.2 |
| 2014/0156461 A1* | 6/2014 | Lerner | G06Q 30/0623 705/26.61 |
| 2014/0207614 A1 | 7/2014 | Ramaswamy et al. | |
| 2015/0278888 A1* | 10/2015 | Lu | G06Q 30/0601 705/14.64 |

OTHER PUBLICATIONS

Hesseldahl, Arik, "Ten O'Clock Tech: Motorola's Pager/Cell Phone," Forbes, https://www.forbes.com/2001/05/23/0523tentech.html#4461bae57306, May 23, 2001.

LRS Paging Systems, https://www.pager.net/products/cell-phone-paging-transmitter-t7460-freedom/, 2019.

\* cited by examiner

PHYSICAL SHOPPING WITH PHYSICAL AND/OR VIRTUALIZED CUSTOMER ASSISTANCE

RELATED APPLICATIONS

This application claims priority to U.S. Provisional Patent Application No. 62/295,591, filed Feb. 16, 2016 and entitled "Physical Shopping Cart with Physical and/or Virtualized Customer Service," the entirety of which is incorporated by reference herein.

BACKGROUND OF THE INVENTION

Technical Field

This invention relates to improving the physical shopping experience with a combination of physical and/or virtualized customer assistance.

State of the Art

Background and Statement of the Problem

Customers have a poor shopping experience when a customer assistance associate is not available to assist them with a product purchase. When planning on buying a specialized product, customers may want to talk to a customer assistance associate about the benefits and disadvantages of that product and related products before they will purchase.

When a customer service associate is not readily available, such as when on break, the customer may rush into buying a product that does not meet their needs and ultimately return the product. The customer may also leave the retail store without purchasing the product. Not providing customer assistance in a timely manner reduces efficiency and creates a larger overhead and inventory.

Accordingly, what is needed is an improvement in a customer's shopping experience by giving customers quick access to customer assistance when purchasing a product. A mobile application is needed to allow a customer to receive assistance, physical and/or virtual, from their mobile device.

DISCLOSURE OF THE INVENTION

The disclosed invention relates to physical shopping in a retail store with physical and/or virtualized (remote) customer assistance.

Disclosed is a system for providing customer assistance for a product in a retail store comprising a central processor having a customer assistance module; a mobile computing device of a physical customer assistance associate in communication with the central processor; a mobile computing device of a customer in communication with the central processor, wherein the mobile computing device captures product barcode data of the product; and overhead pendants in communication with the mobile computing device of the customer and the central processor, wherein the central processor and the overhead pendants communicate via wireless communication with the mobile computing device of the customer.

In one aspect, disclosed is a system for providing customer assistance foe a product in a retail store wherein the central processor communicates via wireless communication with the mobile computing device of the physical customer assistance associate. The central processor and the overhead pendants receive the product barcode data capture for the product from the mobile computing device of the customer. The customer assistance module determines if the physical customer assistance associate is available based on a time and attendance schedule and qualifications and pushes a customer assistance request to the mobile computing device of the physical customer assistance associate if the physical customer assistance associate is available. The customer assistance module pushes a notification to the mobile computing device of the customer of the availability of the physical customer assistance associate. The notification comprises a name of the physical customer assistance associate.

In another aspect, disclosed is a system for providing customer assistance for a product in a retail store wherein if the physical customer assistance associate is unavailable, the customer assistance module determines if a remote customer assistance associate is available and sends a message box interface with the remote customer assistance associate to the mobile computing device of the customer if the remote customer assistance associate is available. If the remote customer assistance associate is unavailable, the customer assistance module sends a product comparison display to the mobile computing device of the customer. The customer assistance request comprises location of the product. The customer assistance request comprises location of the mobile computing device of the customer.

In another aspect, disclosed is a system for providing customer assistance for a product in a retail store comprising the mobile computing device of the customer registers on a store network of the central processor establishing a token. A beacon on the mobile computing device of the customer pings as the mobile computing device of the customer moves throughout the retail store. At least three of the overhead pendants receive the pings from the beacon and the central processor triangulates a location of the mobile computing device of the customer as the mobile computing device of the customer moves throughout the retail store. The overhead pendants comprise an antenna. The overhead pendants may also comprise signage. Even if the physical or remote customer assistance associate is available, the customer assistance module may send a product comparison display to the mobile computing device of the customer. The product comparison display comprises product model information and/or product price data. The dialog box comprises an image of the remote customer assistance associate. The customer assistance module sends a customer satisfaction survey to the mobile device of the customer.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION OF EMBODIMENTS OF THE INVENTION

Figure 1:
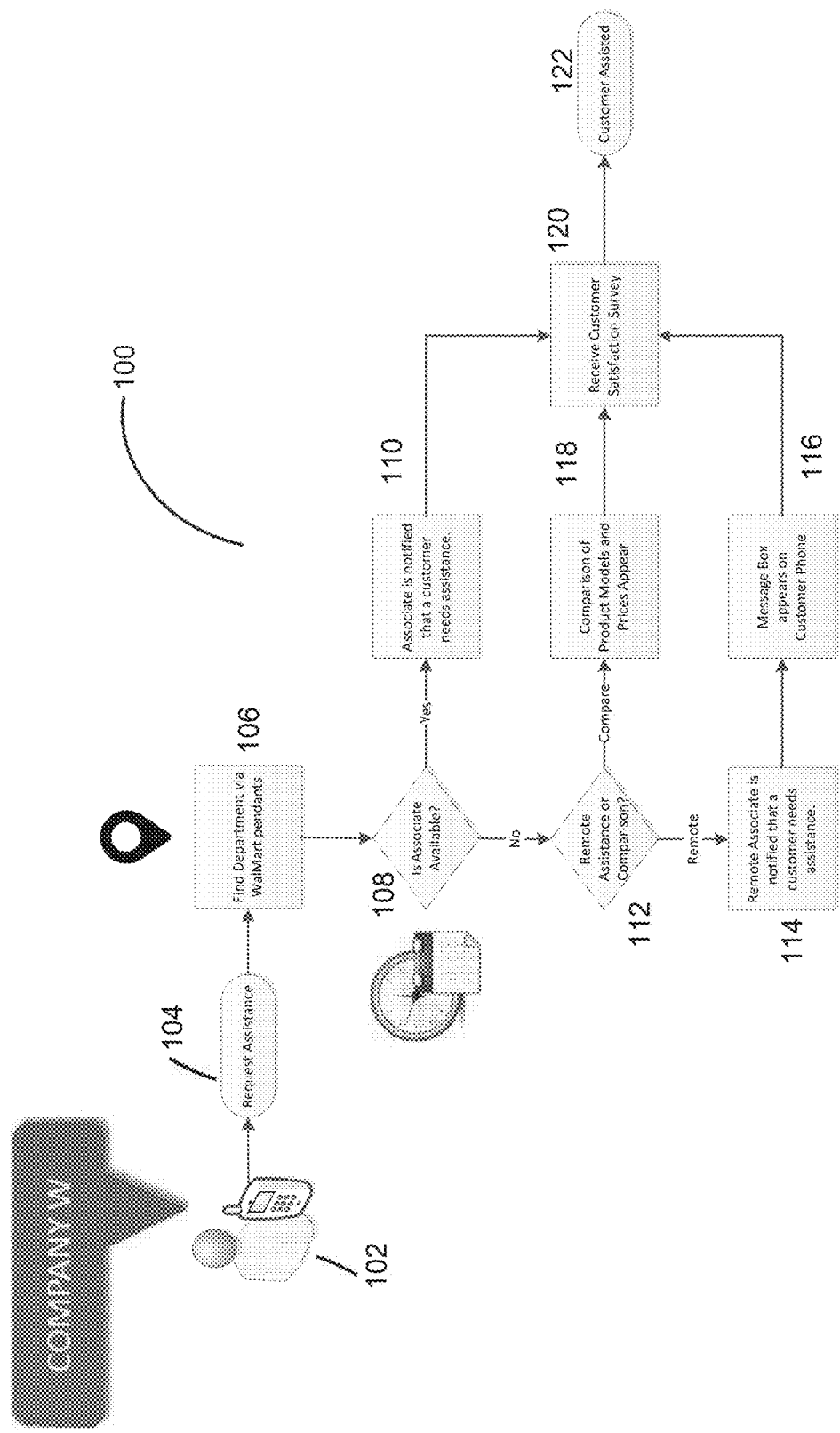
FIG. 1 shows a workflow diagram according to the invention.

As discussed above, embodiments of the present invention relate to a system for physical shopping wherein customer receives physical and/or virtualized customer assistance for a desired product.

The customer assistance application provides a menu of services that enables customer assistance physically and remotely. The options available to the customer include being able to page an on duty associate, receive assistance from a remote associate through an interactive interface, and to receive a comparison of the product to others in stock.

A customer may log into the customer assistance application via a mobile device. In order to request assistance a customer would access the customer assistance application and enter a product code, for example by scanning the barcode or by keying in the product code, for the product the customer would like assistance with. The customer assistance application would then use the overhead pendant to locate what department the customer is currently in and what aisle the product is on. The customer assistance application will then determine if a customer assistance associate with knowledge of the department is available according to their time and attendance schedule and/or network location positioning.

In one embodiment, the customer assistance application would find that a customer assistance associate is available and send a notification to the associate. The customer assistance associate will then approach the department and aisle where the product is located and assist the customer.

In a second embodiment, the customer assistance application determines all customer assistance associates with knowledge about the department where the product is located are unavailable. A remote customer assistance associate is then notified that a customer needs assistance and information about the product is transferred. A message box appears on the mobile device in order to communicate with the remote customer assistance associate.

In a third embodiment, a customer selects a comparison of the product with related products currently in stock including key features and prices. Optionally, the comparison may be selected in conjunction with a physical customer assistance associate and/or a remote customer assistance associate.

In addition to requesting assistance on the mobile device, the customer may also request a list of services related to the product; request a delivery option; request a delivery window of time; request warranty information, such as extensions on the product; and/or request a packaging option for the product.

The qualifications for the physical and/or remote customer assistance associate are evaluated based on their qualifications for the department/product that the request is pertaining to, i.e. a customer assistance associate for the paint department/paint requires certification.

The remote customer assistance associate may be located in the retail store and/or a vendor associated with the product the customer is requesting assistance for. The remote customer assistance may also be located external to the retail store, i.e. in a regional office, home office and/or international office connected with the retail store. If the customer requests assistance in a foreign language or by text only, a preferred language or text type communication to the remote associate or vendor. In addition, the remote customer assistance associate can be requested at the outset and not only when the physical customer assistance associate is unavailable.

FIG. 1 shows workflow diagram 100 of the system for providing customer assistance in a retail store. A customer accesses a customer assistance application on a mobile device and requests assistance for a particular product 102. Department and store ID is captured via overhead pendant 106. A central processor determines the availability of a physical customer assistance associate 108. If a physical customer assistance associate is available, the physical customer assistance associate is notified that a customer needs/requests assistance 110. If the answer is no, the central processor determines the availability of a remote customer assistance associate 112. If a remote customer assistance associate is available, the remote customer assistance associate is notified that a customer needs/requests assistance 114 and a message box appears on the mobile device 116. If the answer is no, a comparison of related product models and product prices is generated 118. A customer satisfaction survey is generated 120 and the customer is assisted 122.

The overhead pendants may comprise retail signage, such as retail store name and/or department. Each overhead pendant comprises an antenna, which may be 802.11 enabled. The antennas are connected to a central processor. The physical location in the retail store of each antenna is defined in the central processor. The antennas' network is about equal in signal strength, each antenna having about equal response time to the central processor. Each antenna location is mapped to the aisle location and department.

Figure 2:
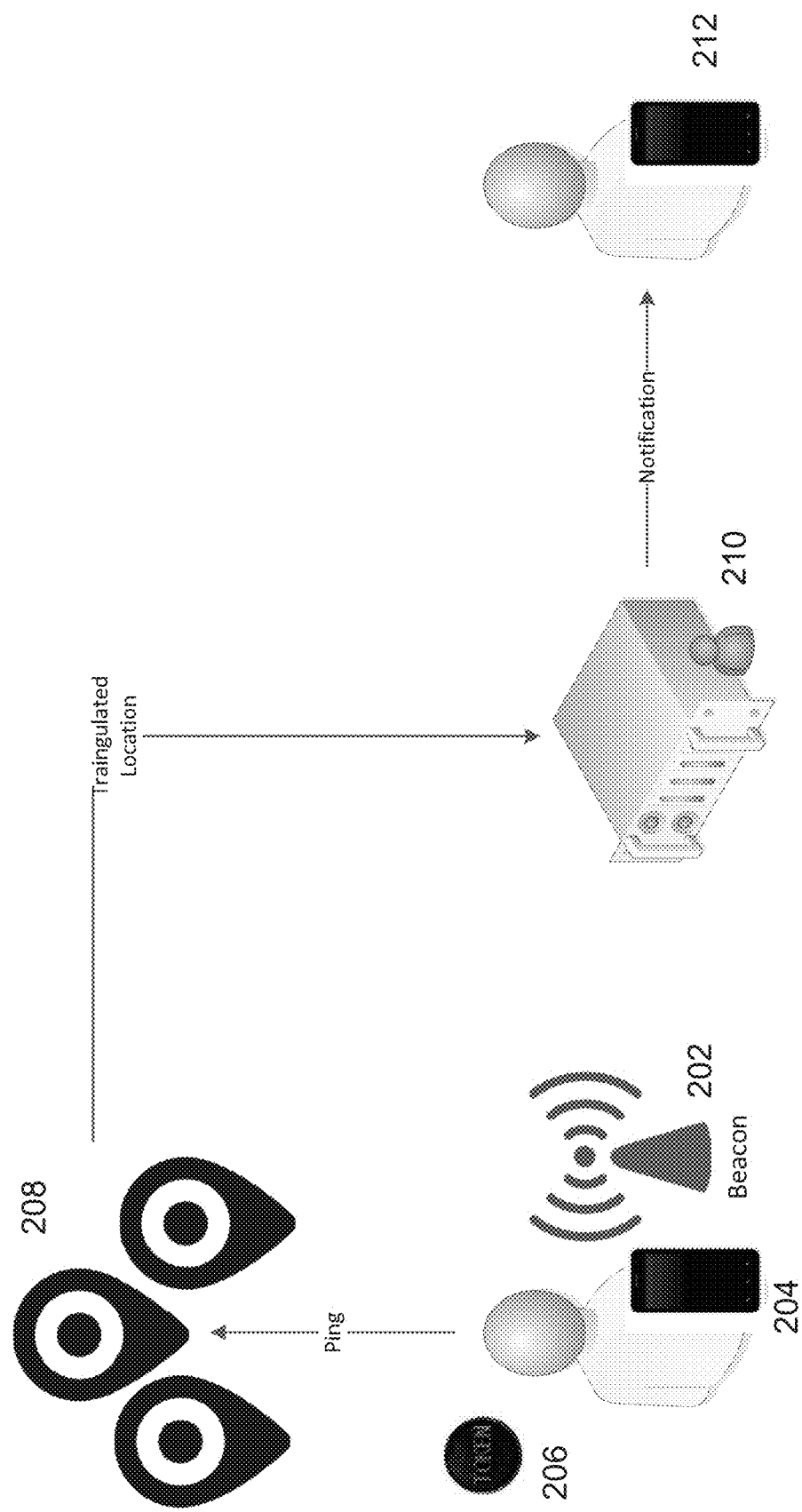
FIG. 2 shows an illustration of a customer location system according to the invention.

As shown in FIG. 2, customer mobile device 204 registers on the store network back end server or central processor 210 and establishes a token 206. In the registration of the mobile device 204, data is transmitted to the central processor, including a time stamp, down to about a millisecond. As the customer walks, a beacon 202 on the mobile device 204 pings on a cadence. Pendant (antenna) array 210 receives the ping and each antenna records the time it receives the ping. From taking any three (3) known positions and the time variance between the pendants and the customer's mobile device, a position of the customer is triangulated. The processing occurs on the central processor hardware, not the customer's mobile device. The location of the customer is then relayed to the physical customer assistance associate mobile device 212 and a message is relayed to the customer mobile device 204 as to the name of the physical customer assistance associate who will provide assistance.

Figure 3:
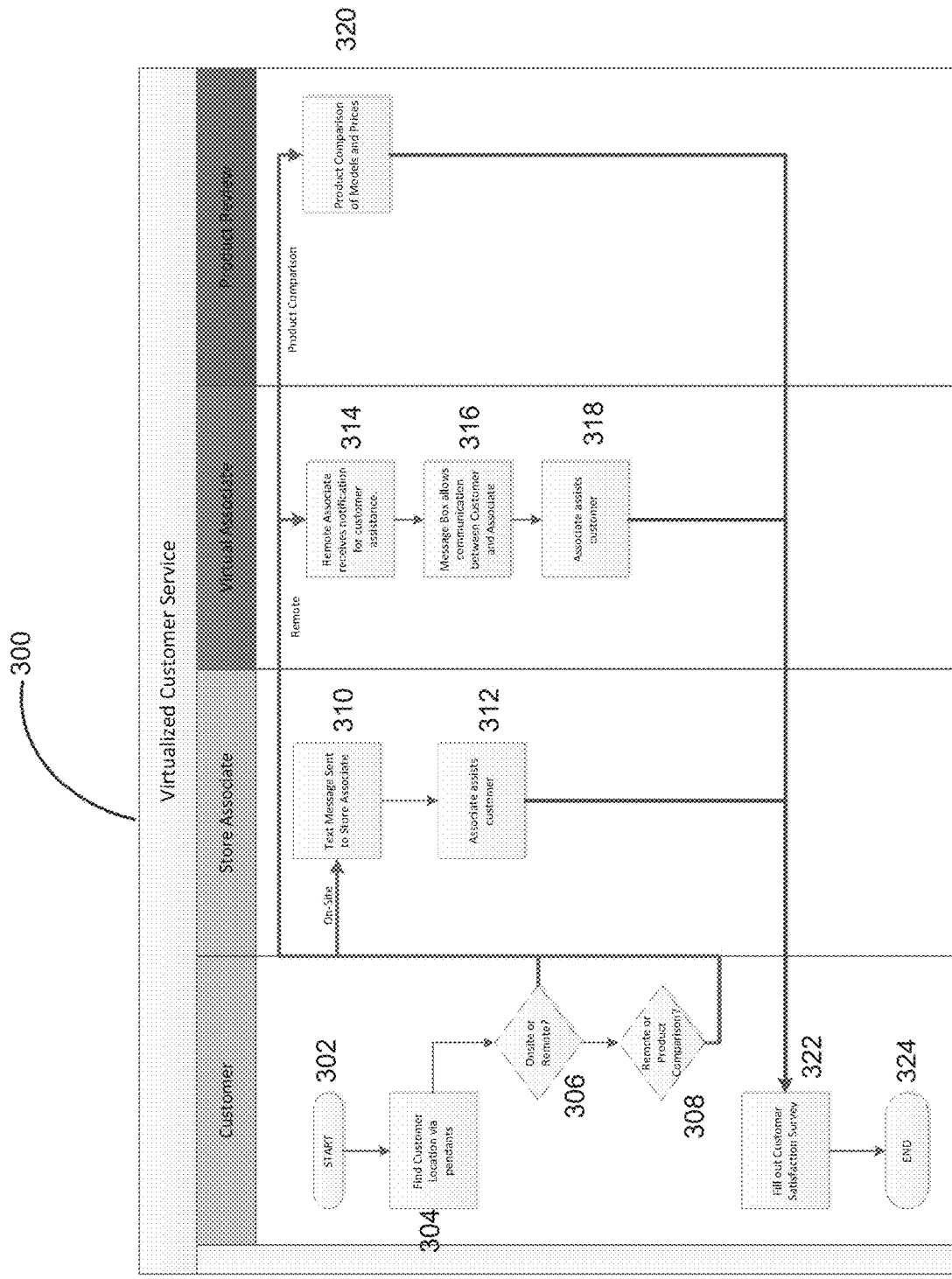
FIG. 3 shows a process flow diagram according to the invention.

FIG. 3 illustrates a process flow diagram from start to finish of the computer system providing physical/virtualized customer service according to the invention 300. Customer starts 302 and the customer location is found via overhead pendants 304. Physical (onsite store) or remote (virtual) customer assistance is determined 306. If physical (onsite store) customer assistance available, a text message is sent to a physical (onsite store) customer assistance associate 310 and the physical (onsite store) customer assistance associate assists customer 312. If the physical (onsite store) customer assistance associate is unavailable, a remote (virtual) customer assistance associate receives notification for customer assistance 314. A message box on a customer mobile device allows communication between customer and remote (virtual) customer assistance associate 416 and the remote (virtual) customer assistance associate assists customer 318. If the physical (onsite store) customer assistance associate and the remote (virtual) customer assistance associate are unavailable, a product comparison of models and prices is generated 320. The product comparison of models and prices 320 may also be generated when the physical (onsite store) customer assistance associate and/or remote (virtual) customer assistance associate are available. Customer fills out a customer satisfaction survey with physical (onsite store) customer assistance, remote (virtual) customer assistance and/or product comparison 322 and customer stops 324.

Figure 4:
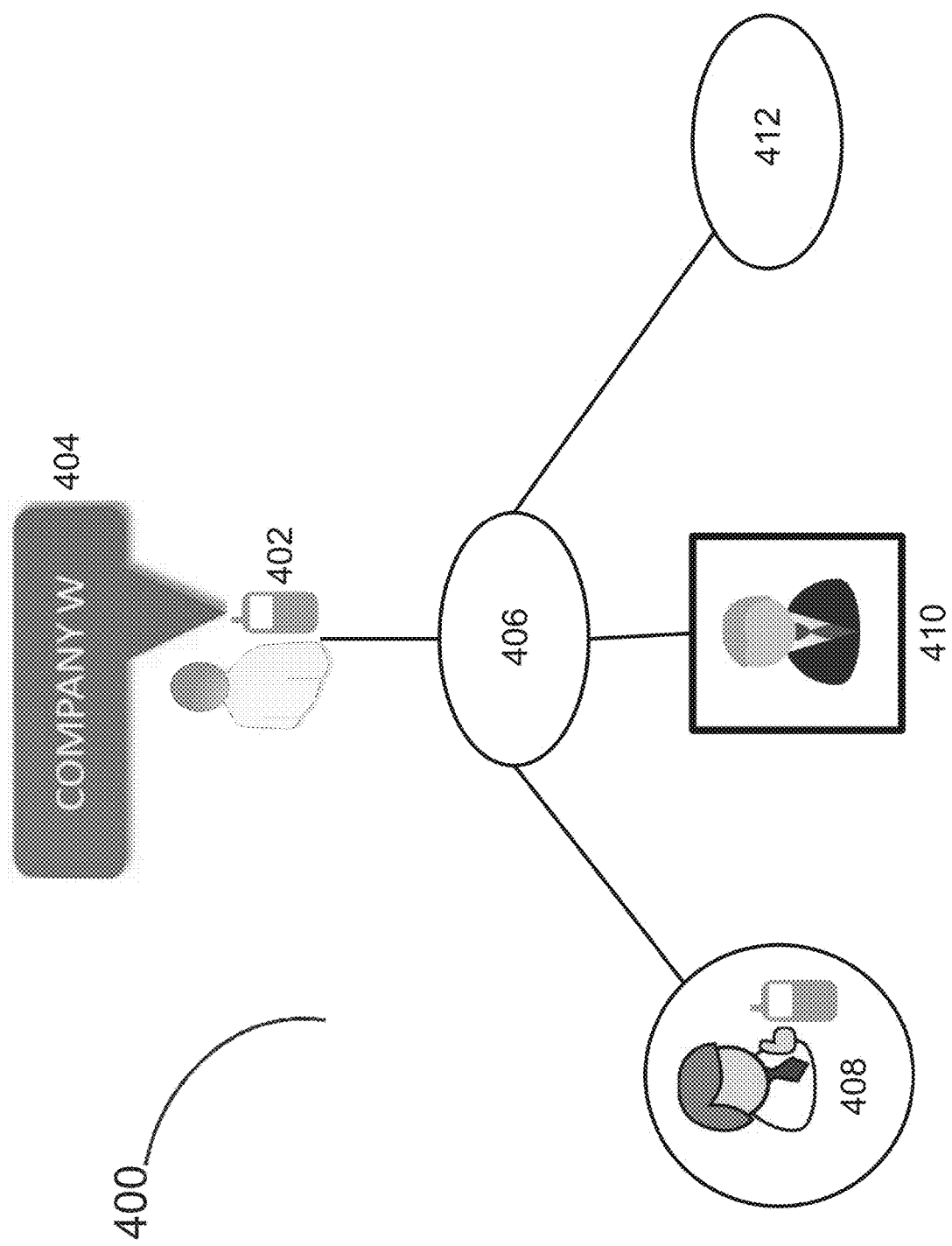
FIG. 4 shows a data flow diagram according to the invention.

FIG. 4 illustrates a data flow diagram of a system for providing customer assistance for a product in a retail store 400. Central processor having a customer assistance module 406 communicates via wireless communication with mobile computing device of physical customer assistance associate 408 and mobile computing device of customer 402. Mobile computing device of customer 402 captures product barcode data of the product customer is requesting assistance for. Overhead pendants 404 communicate via wireless communication with the mobile computing device of customer 402 and central processor 406. Central processor 406 and the overhead pendants 404 receive the product barcode data capture for the product from the mobile computing device of customer 402. Customer assistance module 406 determines if the physical customer assistance associate is available based on a time and attendance schedule and qualifications and pushes a customer assistance request to the mobile computing device of the physical customer assistance associate 408, if the physical customer assistance associate is available. Customer assistance module 406 pushes a notification to the mobile computing device of customer 402 of the availability of the physical customer assistance associate. The notification comprises a name of the physical customer assistance associate. If the physical customer assistance associate is unavailable, the customer assistance module 406 determines if a remote customer assistance associate is available and sends a message box interface with the remote customer assistance associate 410 to the mobile computing device of the customer 402 if the remote customer assistance associate is available. If the remote customer assistance associate is unavailable, the customer assistance module 406 sends a product comparison display 414 to the mobile computing device of customer 402.

As will be appreciated by one skilled in the art, aspects of physical shopping with physical and/or virtualized customer assistance may be embodied as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

While the invention has been shown and described with reference to specific preferred embodiments, it should be understood by those skilled in the art that various changes in form and detail may be made therein without departing from the spirit and scope of the invention as defined by the following claims.

The foregoing and other features and advantages of the invention will be apparent to those of ordinary skill in the art from the following more particular description of the invention and the accompanying drawings.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A system for providing customer assistance for a product in a retail store comprising:
   a central processor having a customer assistance module;
   a mobile computing device of a physical customer assistance associate in communication with the central processor;
   a mobile computing device of a customer in communication with the central processor, wherein the mobile computing device captures product barcode data of the product;
   a beacon on the mobile computing device of the customer, wherein the beacon pings as the mobile computing device of the customer moves throughout the retail store; and
   overhead pendants in communication with the mobile computing device of the customer and the central processor,
   wherein the central processor and the overhead pendants communicate via wireless communication with the mobile computing device of the customer;
   wherein the central processor communicates via wireless communication with the mobile computing device of the physical customer assistance associate;
   wherein the central processor and the overhead pendants receive the product barcode data capture for the product from the mobile computing device of the customer;
   wherein the customer assistance module determines if the physical customer assistance associate is available based on a time and attendance schedule and qualifications and pushes a customer assistance request to the mobile computing device of the physical customer assistance associate if the physical customer assistance associate is available;
   wherein the customer assistance module pushes a notification to the mobile computing device of the customer of the availability of the physical customer assistance associate;
   wherein if the physical customer assistance associate is unavailable, the customer assistance module determines if a remote customer assistance associate is available and sends a message box interface with the remote customer assistance associate to the mobile computing device of the customer if the remote customer assistance associate is available;
   wherein if the remote customer assistance associate is unavailable, the customer assistance module sends a product comparison display to the mobile computing device of the customer;
   wherein the mobile computing device of the customer registers on a store network of the central processor establishing a token; and
   wherein at least three of the overhead pendants receive the pings from the beacon and the central processor triangulates a location of the mobile computing device of the customer as the mobile computing device of the customer moves throughout the retail store.

2. The system of claim 1, wherein the notification comprises a name of the physical customer assistance associate.

3. The system of claim 1, wherein the customer assistance request comprises location of the product.

4. The system of claim 1, wherein the customer assistance request comprises location of the mobile computing device of the customer.

5. The system of claim 1, wherein the overhead pendants comprise an antenna.

6. The system of claim 1, wherein the overhead pendants comprise signage.

7. The system of claim 1, wherein if the remote customer assistance associate is available, the customer assistance module sends a product comparison display to the mobile computing device of the customer.

8. The system of claim 1, wherein if the physical customer assistance associate is available, the customer assistance module sends a product comparison display to the mobile computing device of the customer.

9. The system of claim 1, wherein the product comparison display comprises product model information and/or product price data.

10. The system of claim 1, wherein the dialog box comprises an image of the remote customer assistance associate.

11. The system of claim 1, wherein the customer assistance module sends a customer satisfaction survey to the mobile device of the customer.

* * * * *